United States Patent [19]

Harden

[11] Patent Number: 5,613,907
[45] Date of Patent: Mar. 25, 1997

[54] LIGHTWEIGHT CONCAVE HAVING REMOVABLE GRIDS

[75] Inventor: Philip A. Harden, Colona, Ill.

[73] Assignee: Deere & Company, Moline, Ill.

[21] Appl. No.: 533,530

[22] Filed: Sep. 22, 1995

[51] Int. Cl.$^6$ ................................................ A01F 12/28
[52] U.S. Cl. ........................................ 460/109; 460/110
[58] Field of Search ................................ 460/109, 107, 460/108, 110, 71, 72

[56] References Cited

U.S. PATENT DOCUMENTS

| 4,192,322 | 3/1980 | Wilson. | |
|---|---|---|---|
| 4,422,463 | 12/1983 | West. | |
| 4,499,908 | 2/1985 | Niehaus. | |
| 4,875,891 | 10/1989 | Turner et al. | 460/110 |
| 4,909,772 | 3/1990 | Kuchar | 460/110 X |
| 5,024,631 | 6/1991 | Heidjann et al. | 460/75 |
| 5,057,056 | 10/1991 | Kambeitz | 460/110 |

FOREIGN PATENT DOCUMENTS 2063039  6/1981  United Kingdom ................... 460/109

OTHER PUBLICATIONS

Projection Welding article, pp. 434, 438–439, 448–450, 452–453, and 464. (Date unknown).
Resistance Welding article, pp. 13–38 thru 13–40. (Date unknown).

Primary Examiner—Terry Lee Melius

[57] ABSTRACT

The invention is directed to a concave for a rotary crop processing unit for an agricultural combine. The concave comprises a frame to which is releasably mounted a grid. The grid comprises a plurality of curved rods to which are projection welded a series of straight bars. The bars are perpendicular to the rods. The grid is held in place by a mounting assembly which is formed by six mounting ears that are welded to the frame that clamp the grid against a curved rim. A trapping lip is also used to trap one end of the grid in the frame.

13 Claims, 3 Drawing Sheets

5,613,907

LIGHTWEIGHT CONCAVE HAVING REMOVABLE GRIDS

BACKGROUND OF THE INVENTION

1. Field of the Invention

The invention is directed to a lightweight concave for a rotary agricultural combine having a bar and wire removable grid that is formed by projection welding.

2. Description of the Prior Art

Agricultural combines are large machines that harvest, thresh, separate and clean an agricultural crop. The resulting clean grain is stored in a grain tank located on the combine. The clean grain can then be transported from the grain tank to a truck, grain cart or other receiving bin by an unloading auger.

There are two basic types of combines: (1) a conventional combine having a transverse threshing cylinder and straw walkers, and (2) a rotary combine having a rotor and rotor casing for threshing and separating the harvested crop. The transverse threshing cylinder is mounted in close proximity to a concave. The rotating threshing cylinder in conjunction with the fixed concave threshes the crop material. The concave generally comprises a series of transversely extending bars through which are inserted axially running wires. A concave of this type forms a grate through which the majority of the threshed grain and chaff fall onto a collecting assembly where it is directed to the cleaning system of the combine. U.S. Pat. No. 4,909,772 illustrates such a concave. U.S. Pat. No. 5,024,631 discloses a conventional transverse threshing concave having a frame on which are mounted three removable sieve lining sections.

Rotary combines are provided with an infeed section for pulling crop material into the rotary crop processing assembly from the feederhouse, a threshing section for threshing the crop material, and a separating section for separating the grain from the threshed crop material. The rotary crop processing unit comprises a rotor that is surrounded by a casing. The bottom of the casing is provided with a series of grates through which the grain and chaff fall from the casing. The grates located beneath the threshing section of the rotary crop processing unit comprises a concave, such a concave is disclosed in U.S. Pat. No. 4,499,908. In this patent one side of the concave is pivotally mounted to the crop processing unit and the other side is adjustably mounted to the crop processing unit to control the clearance between the concave and rotor. U.S. Pat. Nos. 4,192,322 and 4,422,463 each show a spiral wire concave in which a spiral wire is welded to a series of axially extending spacer bars.

Projection welding is a form a resistance welding wherein the heat for the welding is derived from the localization of electrical resistance at predetermined points by means of projections. The projections maybe made of stamping or machining.

SUMMARY

It is an object of the present invention to provide a lightweight concave for the threshing section of a rotary combine having easily removable grids.

It is a feature of this invention that the grids are formed by projection welding.

The concave of the present invention is used in a concave having a rotary processing unit. It comprises a frame having at least two longitudinally extending curved members which are joined together by at least two laterally extending members. A grid is removably mounted to the frame. The grid of the concave is formed by projecting welding a series of wire-like rods onto rectangular bar stock by projection welding. Before welding, the bar stock is arranged in a fixture. The fixture holds the straight bar stock in a curved arrangement so that the grid assumes a curved configuration after the welding process.

After the grid is formed, it is secured to the frame by a first mounting assembly. The first mounting assembly comprises six ears which are welded to the curved members of the frame. The ears are provided with mounting bolts for clamping the grid to the frame. Each of the curved members is provided with a curved rim. The grid is clamped against the curved rim by the mounting bolts. In addition to the ears and mounting bolts, a trapping lip is formed in one of the laterally extending members and traps the grid between the lip and the curved rims.

The laterally extending members form a second mounting assembly for mounting the concave to the rotary processing unit. More specifically, one of the laterally extending members is provided with a pivotal connection for pivotally coupling the concave to the combine. The other laterally extending member is provided with a clearance connection which is an adjustable connection for adjusting the clearance of the concave relative to the rotor.

DETAILED DESCRIPTION

Figure 1:
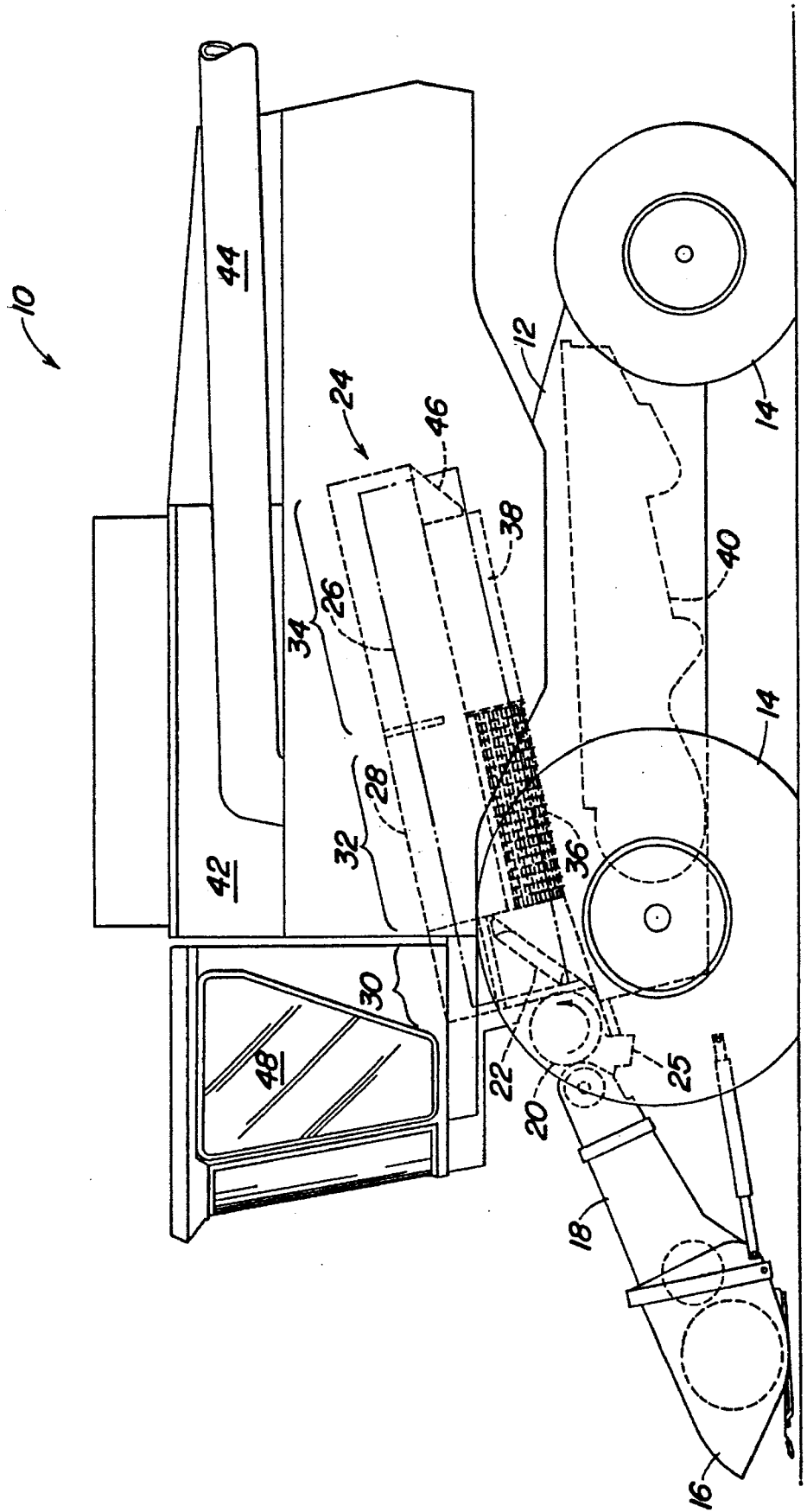
FIG. 1 is a semi-schematic side elevation of a self propelled combine having a rotary processing unit.
Figure 2:
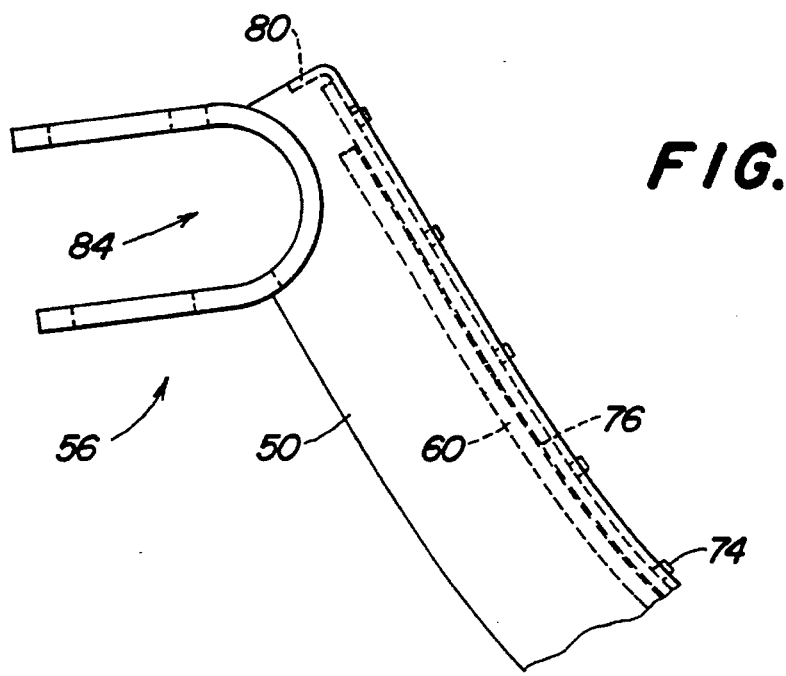
FIG. 2 is an enlarged side view of the pivotal connection of the concave frame.

FIG. 1 shows an agricultural combine 10 comprising a supporting structure 12 having ground engaging means 14 extending from the supporting structure. A harvesting platform 16 is used for harvesting a crop and directing it to a feederhouse 18. The harvested crop is directed by the feederhouse 18 to a beater 20. The beater directs the crop upwardly through the inlet transition section 22 to the rotary crop processing unit 24. A rock trap 25 is positioned between the feederhouse and the beater 20.

The rotary crop processing unit 24 threshes and separates the harvested crop material. It comprises a rotor 26 and a casing 28 that define an inlet section 30, a threshing section 32 and a separating section 34. The bottom of the casing is provided with a concave 36 under the threshing section 32 and a separating grate 38 under the separating section 34.

Grain and chaff falling through the concave 36 and the separating grate 38 are directed to cleaning system 40. The cleaning system 26 removes the chaff and directs the clean grain to a clean grain elevator (not shown). The clean grain elevator deposits the clean grain in a grain tank 42. The clean grain in the tank 42 can be unloaded into a grain cart or truck by an unloading auger 44.

The present invention is directed to the concave 36 located under the threshing section 32 of the rotary crop processing unit 24. The present invention could be used as a separating grate. However in the preferred embodiment the separating grate is a comb separating grate similar to the one disclosed in U.S. Pat. No. 4,875,891, which is incorporated herein by reference.

Threshed and separated straw is discharged from the rotary crop processing unit 24 through outlet 46 to a discharge beater (not shown). The discharge beater in turn propels the straw out the rear of the combine. The operation of the combine is controlled from operator's cab 48.

The rotor 26 comprises a hollow cylindrical drum having a plurality of crop processing elements which are used to engage the crop and rotate it in the casing 28. A series of helical elements (not shown) located in the casing housing index the crop rearwardly.

Three concave sections form concave 36. Each section comprises a frame 49 having three curved longitudinally extending members 50, 52 and 54. These curved longitudinally extending members are joined at their ends by laterally extending members 56 and 58. The two outside longitudinally extending members 40 and 44 are provided with a curved rim 60 along their inside surfaces 62. The outside longitudinally extending members 50 and 54 are also provided with six ears 64 which are welded to the inside surface 62. The ears 64 are provided with mounting bolts 66, mounting nuts 68 and mounting washers 70.

Figure 3:
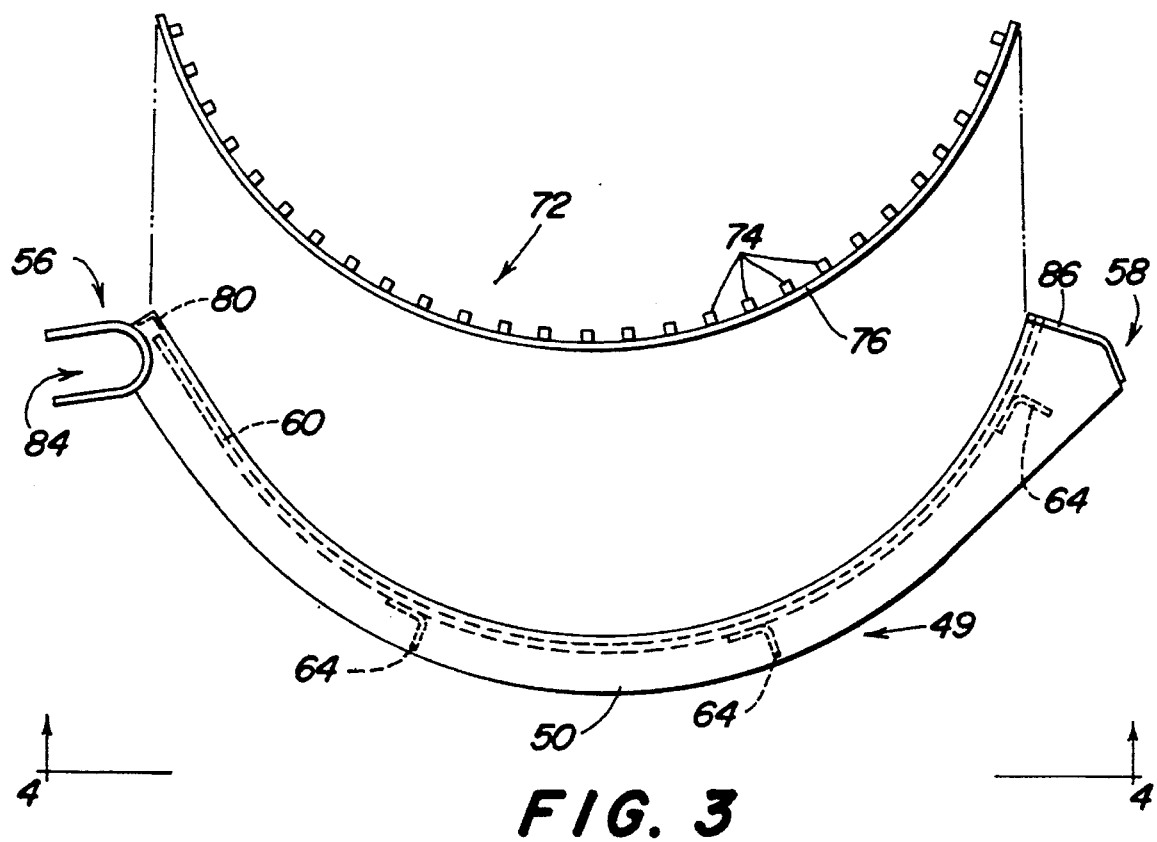
FIG. 3 is an exploded side view of the concave frame and grid.
Figure 5:
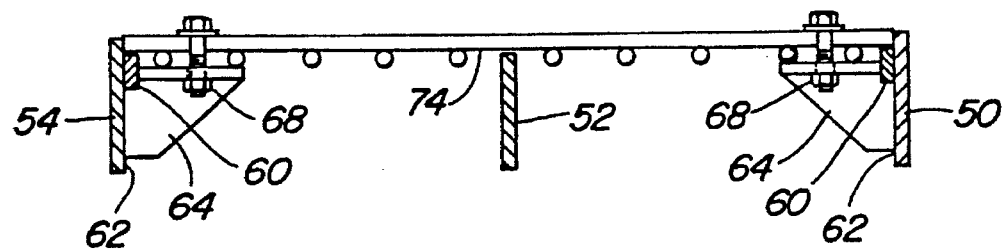
FIG. 5 is a sectional view taken along line 5—5 of the concave of FIG. 4.
Figure 4:
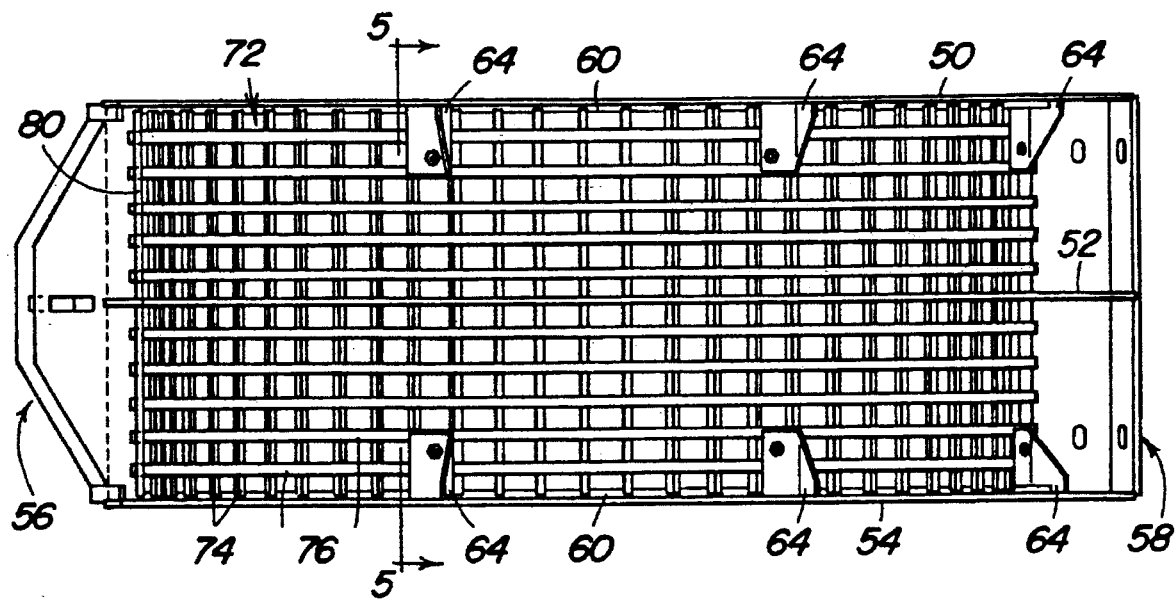
FIG. 4 is a top view of the concave.

The concave grid 72 of the present invention comprises a plurality of longitudinally extending rectangular bar stock 74 to which is projection welded laterally extending wire-like rods 76. The grid is projection welded by first mounting the rectangular bar stock 74 in a fixture so that it is arranged in a curved manner as disclosed in FIG. 3. The bar stock 74 is provided with a series of projections for receiving the laterally extending curved wire-like rods 76. The wire rods and bar stock are coupled to a source of electric power. As electric power is switched on it forms a current between the bar stock. Electrical resistance is highest at the projections. As resistance increases, the projections become heated and weld the rods 76 to the bar stock 74.

The grid is mounted to the frame by first inserting it into trapping lip 80. Trapping lip 80 is located on laterally extending member 58. The lip 80 entraps the grid between the lip 80 and the rims 60. The remaining grid is then held in place by the mounting bolts 66 and washers 70 clamping the grid against the rims 60.

Laterally extending member 56 is provided with a pivotal bolt connection 84 so that the concave 36 can be pivotally coupled to the rotary crop processing unit 24. Laterally extending member 58 is provided with a clearance connector 86 comprising an aperture for receiving a concave clearance adjustment bolt (not shown) for adjusting the clearance of the concave relative to the rotor.

The present invention provides a lightweight concave grid that can be easily manufactured, is durable and easily replaceable. As such the invention should not be limited by the above described embodiment, but should be limited solely by the claims that follow.

I claim:

1. A concave for a rotary crop processing unit for an agricultural combine, the concave comprising:

a frame having at least two longitudinally extending curved members that are coupled to one another by two laterally extending members, the frame is provided with a first mounting assembly; and at least one replaceable grid being releasably mounted to the frame by the first mounting assembly engaging the grid, the grid is provided with a plurality of longitudinally extending curved rods and a plurality of laterally extending straight bars, the straight bars are provided with an outer surface, at least one of the rods and the straight bars are provided with projections and are projection welded to one another.

2. A concave as defined by claim 1 wherein the first mounting assembly comprises more than two ears that are attached to the longitudinally extending members, the ears are provided with mounting apertures, mounting bolts and mounting washers for mounting the grid to the frame.

3. A concave as defined by claim 2 wherein at least two of the curved longitudinally extending members are provided with a curved rim which contacts the rods when the grid is mounted to the frame.

4. A concave as defined by claim 3 wherein at least one of the laterally extending members of the frame is provided with a trapping lip for trapping the grid between the lip and the rims.

5. A concave as defined by claim 4 wherein the frame is provided with a second mounting assembly for releasably mounting the concave to a combine.

6. A concave as defined by claim 5 wherein the second mounting means comprises a pivotal connection for pivotally mounting the concave to the rotary crop processing unit.

7. A concave as defined by claim 6 wherein the second mounting means further comprises a clearance adjustment connection for mounting the concave to the rotary crop processing unit.

8. A concave for a rotary crop processing unit for an agricultural combine, the concave comprising:

a frame having at least two longitudinally extending curved members that are coupled to one another by two laterally extending members, the curved members are provided with curved rims, the frame is provided with a first mounting assembly, the first mounting assembly comprises more than two ears that are attached to the longitudinally extending members, the ears are provided with mounting bolts and mounting washers; and at least one replaceable grid being releasably mounted to the frame by the first mounting assembly engaging the grid, the grid is provided with a plurality of longitudinally extending curved rods and a plurality of laterally extending straight bars, at least one of the straight bars and the rods are provided with projections and are projection welded to one another, the mounting bolts and washers clamp the grid to the curved rim of the curved members.

9. A concave as defined by claim 8 wherein at least one of the laterally extending members of the frame is provided with a trapping lip for trapping the grid between the lip and the rims.

10. A concave as defined by claim 9 wherein the frame is provided with a second mounting assembly for releasably mounting the concave to a combine.

11. A concave as defined by claim 10 wherein the second mounting means comprises a pivotal connection for pivotally mounting the concave to the rotary crop processing unit.

12. A concave as defined by claim 11 wherein the second mounting means further comprises a clearance adjustment connection for mounting the concave to the rotary crop processing unit.

13. A replaceable grid for a concave frame, the grid comprising:

a plurality longitudinally extending curved rods; and a plurality of laterally extending straight bars, the straight bars are provided with an outer surface, at least one of the curved rods and the straight bars are provided with projections that are projection welded to one another.

* * * * *